United States Patent
Hosoe et al.

(10) Patent No.: US 7,179,536 B1
(45) Date of Patent: Feb. 20, 2007

(54) OPTICAL ELEMENT HAVING A LOW SURFACE ROUGHNESS, AN OPTICAL PICKUP DEVICE INCLUDING THE OPTICAL ELEMENT, AND A DIE FOR MAKING THE OPTICAL ELEMENT

(75) Inventors: Shigeru Hosoe, Hachioji (JP); Makoto Banno, Hachioji (JP)

(73) Assignee: Konica Corporation, Tokyo (JP)

( * ) Notice: Subject to any disclaimer, the term of this patent is extended or adjusted under 35 U.S.C. 154(b) by 1239 days.

(21) Appl. No.: 09/670,839

(22) Filed: Sep. 28, 2000

(30) Foreign Application Priority Data

Sep. 29, 1999 (JP) .................................. 11-276209

(51) Int. Cl.
*B32B 9/00* (2006.01)
(52) U.S. Cl. ..................................... 428/446
(58) Field of Classification Search ........... 369/112.23, 369/112.01
See application file for complete search history.

(56) References Cited

U.S. PATENT DOCUMENTS

| | | | | |
|---|---|---|---|---|
| 5,168,404 A | * | 12/1992 | Miyazaki et al. | 359/718 |
| 5,181,141 A | * | 1/1993 | Sato et al. | 359/580 |
| 5,436,764 A | * | 7/1995 | Umetani et al. | 359/566 |
| 5,481,530 A | * | 1/1996 | Ueda et al. | 369/275.1 |
| 5,700,307 A | * | 12/1997 | Kashiwagi et al. | 65/374.1 |
| 5,748,482 A | * | 5/1998 | Nishimura | 700/164 |
| 5,759,221 A | * | 6/1998 | Kashiwagi et al. | 65/102 |
| 5,759,457 A | * | 6/1998 | Inoue et al. | 264/2.5 |
| 5,995,304 A | * | 11/1999 | Nomura et al. | 359/726 |
| 6,003,336 A | * | 12/1999 | Kashiwagi et al. | 204/192.15 |
| 6,009,728 A | * | 1/2000 | Kashiwagi et al. | 65/374.11 |
| 6,119,485 A | * | 9/2000 | Hibino et al. | 65/305 |
| 6,314,064 B1 | * | 11/2001 | Ueda et al. | 369/44.23 |
| 6,504,975 B1 | * | 1/2003 | Yamagata et al. | 385/33 |
| 6,552,990 B1 | * | 4/2003 | Kajiyama et al. | 369/112.06 |

FOREIGN PATENT DOCUMENTS

JP 11-268920 * 5/1999

OTHER PUBLICATIONS

MAT (machine assisted translation of) JP 11-268920.*
MAT (Machine assisted translation of) JP 11-207751, pub. date of Mar. 1999.*

* cited by examiner

*Primary Examiner*—A M Psitos
(74) *Attorney, Agent, or Firm*—Finnegan, Henderson, Farabow, Garrett & Dunner, L.L.P.

(57) ABSTRACT

An optical pickup device for recording and/or reproducing information in an optical information recording medium, comprises a light source to emit light flux having a central wavelength not longer than 500 nm; a converging optical system to converge the light flux emitted from the light source onto an information recording surface of the optical information recording medium; and an optical detector to detect light flux reflected from the information recording surface of the optical information recording medium or the light flux passing through the information recording surface of the optical information recording medium; wherein the converging optical system or the optical detector comprises at least one optical element and the optical element comprises at least one optical surface having a center-line mean roughness Ra of 5 nm or less.

1 Claim, 12 Drawing Sheets

Interferogram of cut Aluminum sphere by new diamond turning machine

Interferogram of cut Al sphere after 6 hours by new diamond turning machine

Diamond tool cutting edge after 3 km length ENP cutting

OPTICAL ELEMENT HAVING A LOW SURFACE ROUGHNESS, AN OPTICAL PICKUP DEVICE INCLUDING THE OPTICAL ELEMENT, AND A DIE FOR MAKING THE OPTICAL ELEMENT

BACKGROUND OF THE INVENITON

This invention relates to an optical element having an optical surface with a specified surface roughness, an optical system including this optical element, an optical pickup device, and a molding die capable of obtaining the optical element.

In recent years, in the high-density recording based on an high-density optical recording medium of gigabyte order such as various kinds of DVD's and a large-capacity MO which have been being actively brought into practice, the pickup optical system is made to have a remarkably high precision, a high function, and a high degree of difficulty. In particular, in the aspherical objective lens which is one of the key parts of the device, heretofore, it has been generally required to make its NA high for improving light collecting ability, to make high the precision of the shape of its optical surface because of the wavelength of the light from the light source being made short, and efforts for improving them have been made.

On the other hand, as a result of diligent studies, the inventors have recognized that a sufficient optical performance can not be obtained by only the above-described high NA and high precision of the shape of the optical surface, and especially, in the case where the wavelength of the light source becomes 500 nm or less, they have discovered that the influence of the surface roughness of the optical element becomes very large, and also it becomes large the influence to the performance of reading and recording of the optical information recording medium. Thus, on the basis of their finding, the inventors come to think of this invention. The detail will be described below.

In particular, with respect to Rayleigh scattering, which is produced by fine particles having a size of the same order as the light wavelength, the amount of scattered light is basically large for a coherent light like a laser beam, and it becomes large in inverse proportion to the fourth power of the wavelength of the used light source; therefore, a remarkable loss of light quantity comes to be produced by fine ruggedness and dusts on the optical surface when the wavelength is short. This makes a cause of serious bad operations such as the decrease of contrast of the focus spot owing to the scattered stray light and the occurrence of an error owing to the deficient light quantity at the time of reading and writing of an optical disk. As the countermeasure of it, it is thinkable to use a semiconductor laser having higher output for the light source; however, because a semiconductor laser becomes very high-priced and has a low reliability for a large output, it is not a suitable method to use it in an optical system for a pickup for which a high reliability is required. With regard to Rayleigh scattering, the intensities of the scattered light at 650 nm, which is the wavelength of a light source used for a DVD, 500 nm, and 400 nm, which are the wavelengths of light sources for optical disks of the next generation are shown in the following Table 1, in which the intensity of the scattered light at 780 nm, which is the wavelength of a light source used for a conventional CD, is given a value 1.0 for the same surface roughness as those.

TABLE 1

| Wavelength of used light source (nm) | 780 | 650 | 500 | 400 |
|---|---|---|---|---|
| Rayleigh scattering | (1) | 2.1 | 5.9 | 14.5 |

From Table 1, it can be understood that Rayleigh scattering increases more suddenly when the wavelength of the used light source comes to the neighborhood of 500 nm or less.

As described in the above, in the case where the wavelength of the light source becomes 500 nm or less, because the influence of the surface roughness of the optical element becomes very large, and also it becomes large the influence given to the performance of reading and recording of the optical information recording medium, the inventors come to make this invention by specify a desirable surface roughness of the optical element. Further, in the case where information is recorded on an optical information recording medium, it is desirable, especially in the optical system, to reduce the loss of light quantity.

SUMMARY OF THE INVENTION

It is an object of this invention to provide an optical element and an optical system capable of reducing scattered light for a light having a short wavelength, an optical pickup system capable of preventing an error in reading and writing by reducing scattered light even in the case where a light source having a shorter wavelength than conventional one is used, and a molding die capable of obtaining the above-described optical element. Further, it is another object of this invention to reduce the loss of light quantity as much as possible in the recording and reproducing on and from an optical information recording medium for a short wavelength.

In order to accomplish the above-described objects, after diligent studies, the inventors find that, in an optical pickup device using a light source of a short wavelength, the surface roughness of the optical surface of the optical elements such as the collimator lens and the objective lens used in the pickup optical system must be made small enough, and in particular, for a light having a short wavelength of 500 nm or less, they made it clear that the surface roughness defined by center-line mean roughness (Ra) of the optical surface should be 5 nm or less, and have come to make this invention.

Namely, the above object can be attained by the following structures and methods.

(1-1) An optical pickup device for recording and/or reproducing information in an optical information recording medium, comprises:

a light source to emit light flux having a central wavelength not longer than 500 nm;

a converging optical system to converge the light flux emitted from the light source onto an information recording surface of the optical information recording medium; and an optical detector to detect light flux reflected from the information recording surface of the optical information recording medium or the light flux passing through the information recording surface of the optical information recording medium;

wherein the converging optical system or the optical detector comprises at least one optical element and the optical element comprises at least one optical surface having a center-line mean roughness Ra of 5 nm or less.

(1-2) The optical pickup device of (1-1), wherein the optical element has the optical surfaces having a center-line mean roughness Ra of 5 nm or less on both side surfaces thereof.

(1-3) The optical pickup device of (1-1), wherein the optical surface of the optical element having a center-line mean roughness Ra of 5 nm or less is an aspherical surface.

(1-4) The optical pickup device of (1-2), wherein each of the both side surfaces of the optical element having a center-line mean roughness Ra of 5 nm or less is an aspherical surface.

(1-5) The optical pickup device of (1-1), wherein the optical element is made of a resin material.

(1-6) The optical pickup device of (1-1), wherein the optical element is made of a glass material.

(1-7) The optical pickup device of (1-1), wherein at least one surface of the optical surface of the optical element has a reflectance of 5% or less for light having a wavelength of 400 nm.

(1-8) The optical pickup device of (1-1), wherein at least one surface of the optical surface of the optical element has a reflectance of 3% or less for light having at least a wavelength of 300 nm to 500 nm.

(1-9) The optical pickup device of (1-1), wherein the optical surface of the optical element is not subjected to a polishing process.

(1-10) The optical pickup device of (1-1), wherein the optical element is an objective lens of the converging optical system.

(1-11) The optical pickup device of (1-1), wherein the optical element is a collimator lens of the converging optical system.

(1-12) The optical pickup device of (1-1), wherein the optical element is an optical element for a sensor of the optical detector.

(1-13) An optical element, comprising:
at least one optical surface;
wherein the optical surface has a center-line mean roughness Ra of 5 nm or less.

(1-14) The optical element of (1-13), wherein the optical element has the optical surfaces having a center-line mean roughness Ra of 5 nm or less on both side surfaces thereof.

(1-15) The optical element of (1-13), wherein the optical surface of the optical element having a center-line mean roughness Ra of 5 nm or less is an aspherical surface.

(1-16) The optical element of (1-14), wherein each of the both side surfaces of the optical element having a center-line mean roughness Ra of 5 nm or less is an aspherical surface.

(1-17) The optical element of (1-13), wherein the optical element is made of a resin material.

(1-18) The optical element of (1-13), wherein the optical element is made of a glass material.

(1-19) The optical element of (1-13), wherein at least one surface of the optical surface of the optical element has a reflectance of 5% or less for light having a wavelength of 400 nm.

(1-20) The optical element of (1-13), wherein at least one surface of the optical surface of the optical element has a reflectance of 3% or less for light having at least a wavelength of 300 nm to 500 nm.

(1-21) The optical element of (1-13), wherein the optical surface of the optical element is not subjected to a polishing process.

(1-22) The optical element of (1-13), wherein the optical element is an objective lens.

(1-23) The optical element of (1-13), wherein the optical element is a collimator lens.

(1-24) The optical element of (1-13), wherein the optical element is an optical element for a sensor.

(1-25) An optical information recording and/or reproducing apparatus for recording and/or reproducing information in an optical information recording medium, comprises:
an optical pickup device comprising
a light source to emit light flux having a central wavelength not longer than 500 nm;
a converging optical system to converge the light flux emitted from the light source onto an information recording surface of the optical information recording medium;
and
an optical detector to detect light flux reflected from the optical information recording medium or the light flux passing through the optical information recording medium;
wherein the converging optical system or the optical detector comprises at least one optical element and the optical element comprises at least one optical surface having a center-line mean roughness Ra of 5 nm or less.

(1-26) A molding die for an optical element; comprises:
a molding surface,
wherein the molding surface comprises at least one surface having a center-line mean roughness Ra of 5 nm or less.

(1-27) The molding die of (1-26), wherein the one surface is an aspherical surface.

(1-28) A method of manufacturing a molding die for an optical element, comprises the steps of:
cutting a material of the molding die with a super precision lathe and a diamond tool; and
forming an optical surface transferring surface in the molding die;
wherein the optical surface transferring surface comprises at least one surface having a center-line mean roughness Ra of 5 nm or less.

(1-29) The method of (1-28), wherein a tool roundness of the diamond tool is 30 nm or less.

Further, the above objective may be attained by the following preferable structures.

(2-1) An optical element having on both sides an optical surface with a center-line mean roughness Ra of 5 nm or less.

(2-2) An optical element set forth in the paragraph (2-1), wherein at least one of the aforesaid optical surfaces is aspherical.

(2-3) An optical element set forth in the paragraph (2-1) or (2-2), wherein both of the aforesaid optical surfaces are aspherical.

(2-4) An optical element set forth in the paragraph (2-1), (2-2), or (2-3) being made of a resin material.

(2-5) An optical element set forth in the paragraph (2-4), wherein the aforesaid resin material is a thermoplastic resin.

(2-6) An optical element set forth in the paragraph (2-4), wherein the aforesaid resin material is a thermosetting resin.

(2-7) An optical element set forth in the paragraph (2-4), wherein the aforesaid resin material is a photo-setting resin.

(2-8) An optical element set forth in the paragraph (2-4), (2-5), (2-6), or (2-7), being formed by injection molding.

(2-9) An optical element set forth in the paragraph (2-1), (2-2), or (2-3) being made of a glass material.

(2-10) An optical element set forth in the paragraph (2-9) being formed by glass molding.

(2-11) An optical element set forth in any one of the paragraphs (2-1) to (2-10), wherein at least one of the aforesaid optical surfaces has a reflectance of 5% or less at least for a light having a wavelength of 400 nm.

(2-12) An optical element set forth in any one of the paragraphs (2-1) to (2-10), wherein at least one of the aforesaid optical surfaces has a reflectance of 3% or less for a light having a wavelength of 300–500 nm.

(2-13) An optical element set forth in any one of the paragraphs (2-1) to (2-12) not being subjected to polishing processing.

(2-14) An optical element set forth in any one of the paragraphs (2-1) to (2-13) for use in the optical system for an optical pickup.

(2-15) An optical element set forth in the paragraph (2-14), wherein the aforesaid optical element is a collimator lens.

(2-16) An optical element set forth in the paragraph (2-14), wherein the aforesaid optical element is an objective lens.

(2-17) An optical element set forth in the paragraph (2-14), wherein the aforesaid optical element is an optical element for a sensor.

(2-18) An optical element set forth in any one of the paragraphs (2-1) to (2-17) for use in an optical pickup device comprising a light source having a central wavelength of 500 nm or less.

(2-19) An optical system comprising at least one optical element having on both sides an optical surface with a center-line mean roughness Ra of 5 nm or less.

(2-20) An optical system set forth in the paragraph (2-19), wherein the aforesaid optical element is a collimator lens.

(2-21) An optical system set forth in the paragraph (2-19), wherein the aforesaid optical element is an objective lens.

(2-22) An optical system set forth in the paragraph (2-19), wherein the aforesaid optical element is an optical element for a sensor.

(2-23) An optical system set forth in any one of the paragraphs (2-19) to (2-22) to be used for an optical pickup.

(2-24) An optical system set forth in any one of the paragraphs (2-19) to (2-22), wherein all of the optical elements in the system have on both sides an optical surface with a center-line mean roughness Ra of 5 nm or less.

(2-25) An optical system set forth in any one of the paragraphs (2-19) to (2-24) for use in an optical pickup device comprising a light source having a central wavelength of 500 nm or less.

(2-26) An optical system comprising at least one optical element set forth in any one of the paragraphs (2-2) to (2-18).

(2-27) An optical pickup device comprising a light source having a central wavelength of 500 nm or less and at least one optical element having on both sides an optical surface with a center-line mean roughness Ra of 5 nm or less.

(2-28) An optical pickup device set forth in the paragraph (2-27), wherein the aforesaid optical element is an optical element set forth in any one of the paragraphs (2-2) to (2-18).

(2-29) An optical pickup device set forth in the paragraph (2-27) or (2-28) comprising an optical system set forth in the paragraph (2-20), (2-21), (2-22), or (2-23).

(2-30) A molding die having a molding surface with a center-line mean roughness Ra of 5 nm or less.

(2-31) A molding die having an optical surface molding surface with a center-line mean roughness Ra of 5 nm or less.

(2-32) A molding die having a first optical surface molding surface with a center-line mean roughness Ra of 5 nm or less and a second optical surface molding surface with a center-line mean roughness Ra of 5 nm or less provided opposite to said first optical surface molding surface.

(2-33) A molding die set forth in the paragraph (2-30), wherein the aforesaid molding surface is aspherical.

(2-34) A molding die set forth in the paragraph (3-31), wherein the aforesaid optical surface molding surface is aspherical.

(2-35) A molding die set forth in the paragraph (3-32), wherein at least one of the aforesaid first optical surface molding surface and the aforesaid second optical surface molding surface is aspherical.

(2-36) A molding die set forth in the paragraph (3-32), wherein both of the aforesaid first optical surface molding surface and the aforesaid second optical surface molding surface are aspherical.

DETAILED DESCRIPTION OF THE PREFERRED EMBODIMENTS

Figure 1:
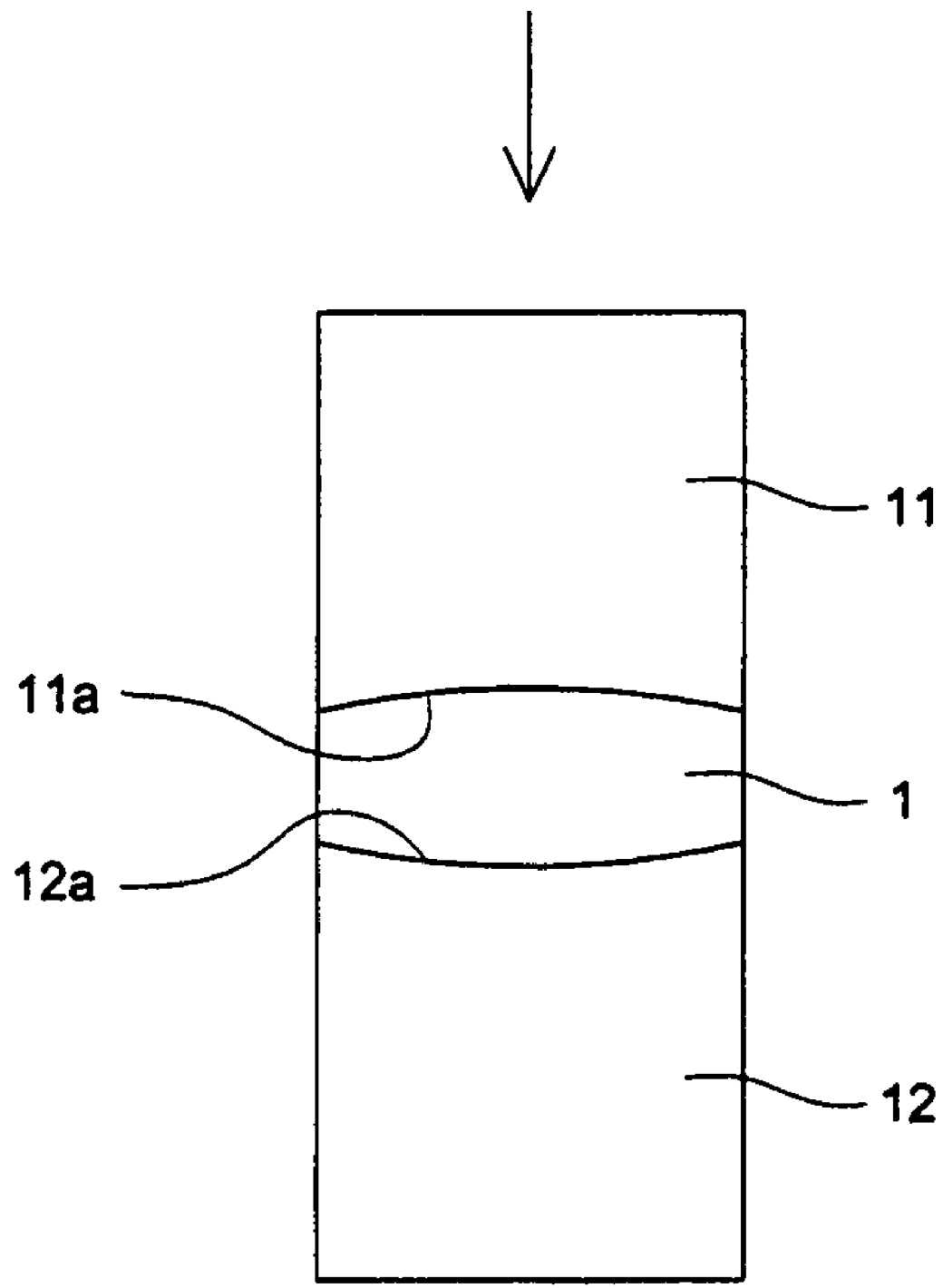
FIG. 1 is a vertical cross-sectional view of the outline of a molding die based on an embodiment of this invention.

The optical element of this invention is characterized by it that it has an optical surface with a center-line mean roughness Ra of 5 nm or less. Further, the optical element of this invention has at least one optical surface with a center-line mean roughness Ra of 5 nm or less (desirably 3 nm or less), and more desirably should have both optical surfaces with a center-line mean roughness of 5 nm or less (desirably 3 nm or less). Incidentally, an optical surface denotes a surface through which a pencil of rays contributing the performance of a lens passes.

This optical element is suitable to be applied to a light having a short wavelength of 500 nm or less, because the amount of scattered light can be reduced especially for a light having a short wavelength of 500 nm or less owing to its optical surfaces (on both sides) with a center-line mean roughness Ra of 5 nm or less. Further, it is desirable that the surface roughness of the optical surface is 0.5 nm or over from the view point of manufacturing; that is, it should desirably fall within a range of 0.5 nm to 5.0 nm Now, the surface roughness defined by center-line mean roughness (hereinafter referred to merely as the center-line mean roughness for simplicity's sake, or may referred as a calculating means roughness) will be explained. According to JIS (B0601-1994), Ra is defined as follows. In a roughness curve which is expressed by the co-ordinates of the scanning direction on the surface and the height direction for a surface roughness measured by a contact needle etc., it is called a mean line, a straight line or a curved line which has the geometrical shape of the measured surface and is determined to be a line such that the sum of the square of the deviations from it to the roughness curve becomes minimum. Usually, a roughness curve is shown in the orthogonal co-ordinates composed of the abscissa representing the direction of the mean line which has been made straight and the ordinate representing the direction of height; a straight line, which is parallel to this mean line and is determined to be a straight line such that the both areas, the upper part and the lower part of the line, surrounded by the line and the roughness curve are made equal to each other, is called a center line.

Assuming that the X-axis is the center line of the portion having a length of 1 which is sampled from the roughness curve in the direction of the center line, the Y-axis is the direction of the vertical magnification (height direction), and the roughness curve is expressed by y=f(x), the center-line mean roughness Ra denotes a value which is obtained by the following expression (1) and is expressed in micrometer.

$$Ra=(1/1)\int |f(x)|d(x) \quad (1).$$

(where integration should be done from 0 to 1)

Further, by making at least one of the aforesaid optical surfaces aspherical, a further effect as follows can be obtained. That is, for methods of forming the optical surface of a molding die for an optical element to be an aspherical shape, most of the methods heretofore relied on a diamond cutting process. By this diamond cutting process, cut traces called cutter marks made by the cutting process while moving on the diamond tool, are left on the optical surface of the metal die, and light scattering is generated by it. Because the lines in the grain are arrayed with an equal interval to function as a diffraction grating, not only scattering but also diffraction is generated. Therefore, when being observed by the application of a strong light, the aspherical optical surface of a conventional molding die presents a rainbow color; because the surface roughness of the optical surface of such a molding die is transferred as it is to an optical element molded by it, the optical element generates a stray light, which has been a cause of lowering the quality of the optical surface. For a method to prevent this, it can be cited a method of polishing the optical surface of the metal die, but it has been very difficult to make the center-line mean roughness Ra 5 nm or less while maintaining the precision of the shape of the optical surface. Accordingly, it is desirable that an optical surface of an optical element having a center-line mean roughness Ra of 5 nm or less is not subjected to a polishing process. In particular, in the case where an optical element is made of a resin material, it should desirably not to be subjected to a polishing process, but in the case where an optical element is made of a glass material, it may be subjected to a polishing process.

Accordingly, it has a great effect, especially in the case where an optical element having an aspherical optical surface for use in an optical system of a short wavelength is produced, to determine definitely the center-line mean roughness Ra of an optical surface of an optical element to work the optical surface of a molding die having an aspherical shape to a surface roughness Ra not larger than that.

Further, it makes the effect of this invention remarkable and is therefore desirable if an optical surface of an optical element having a center-line mean roughness Ra of 5 nm or less is aspherical. Further, in the case where both optical surfaces of an optical element have a center-line mean roughness of 5 nm or less, it is desirable that the both optical surfaces are aspherical. Moreover, owing to the above-described both optical surfaces being aspherical, the above-mentioned effect can be obtained through both of the optical surfaces, which makes the effect larger. Besides, an aspherical surface is easy to have its shape varied by polishing and is easy to be influenced by polishing, (especially in the case where an optical element is made of a resin material,) therefore, it is more desirable not to polish an aspherical optical surface.

The optical element of this invention may be made of a resin material, or may be made of a glass material.

Further, 90% in number or more of the optical surfaces of molding dies in the case where an optical element is made of a resin material are formed by diamond cutting. Accordingly, because the above-described cutter marks are inevitably present on the optical surface of a metal die immediately after cutting, it makes a cause of scattering and diffraction. For that reason, by forming the above-described metal die having an optical surface with a surface roughness quantitatively controlled, an optical element made of a resin material having an optical surface with an Ra of 5 nm or less can be obtained.

In this case, for the above-mentioned resin material, a thermoplastic resin, a thermosetting resin, or a photo-setting resin is desirable. Regarding the molding method by these resin material, injection molding, injection compression molding, heat cycle molding, cast molding, etc. can be cited, but it should not be limited to these. In particular, if molding is done by injection molding, it is desirable for the reasons that manufacturing can be simply done and that manufacturing cost can be suppressed. If molding is done by injection compression molding, it is desirable for the reason that molding can be made by transferring with a higher precision the molding surface of a molding die to the optical surface of an optical element. Further, by heat cycle molding, molding can be made by carrying out the transfer with a higher precision by varying the temperature of a molding die.

In the above, a thermoplastic resin is a resin material which is softened by heating to exhibit plasticity, has a property to be solidified by cooling, and takes most part of the conventional optical element made of a resin material; for example, a polystyrene, an acrylonitrile-styrene, a polymethylmethacrylate, a polycarbonate, a polyolefin, an amorphous polyolefin, a norbornane resin, etc. can be cited, but it is not limited to these.

Further, a thermosetting resin has a property such that by heating it gets a network structure and is made three-dimensional to become a resin which is insoluble and not able to be melted and it is not softened again by heating after it is once hardened; an epoxy resin, an acrylate resin, a methacrylate resin, a styrene resin, an urethane resin, etc. can be cited, but it should not be limited to these. Moreover, heretofore, for a material of a die for molding an optical surface for a thermosetting resin, a glass material is used for spectacles; for contact lenses, an aluminum alloy, a soft metal such as copper, an electroless nickel plating, etc. have been used as in the case of thermoplastic resins. As for the former one, a glass die, because an aspherical shape is formed by a grinding process, polishing by manual operation after working as described in the above has been carried out for improving the surface roughness. As for the latter one, a metal die, because an optical surface is formed by the above-described diamond cutting process, scattering and diffraction owing to cutter marks pose a problem, and in polishing by manual operation after working, it has been judged as satisfactory a compromise between the improvement of the surface roughness and the maintenance of the correct shape of the optical surface. For a use for a short wavelength, heretofore there has been scarcely an optical element made of a thermosetting material. As concrete examples of desirable thermosetting resins, Uv1000, UV200, and UV3000 of Mitsubishi Chemical Corp., RAV-7 of Mitsui Chemicals Inc., Desolite of Japan Synthetic Rubber Co., Ltd. etc. are noted.

Further, a photo-setting resin is a resin having a property to start setting by the application of a UV ray, and usually the speed of setting is accelerated by heating. Accordingly, from the same monomer resin, by selecting a polymerization initiating agent, a thermosetting resin and a photo-setting resin can be selectively produced. Heretofore, it has never happened that an optical element is made solely of a photo-setting resin, and it has been generally used for an adhesive for an optical use, a resist for photolithography, and what is called a hybrid aspherical lens which is composed of a spherical glass lens and a layer having a thickness of 1–200 μm forming an aspherical surface shape. The glass spherical lens which is used as a working base material is produced by a conventional polishing method. The aspherical shape is produced by a die made of the above-described die material or a UV ray transmitting material such as quartz or a glass, and the method of molding the aspherical optical surface is based on the above-described one. Accordingly, heretofore, in working the optical surface of a die, the surface roughness has not been quantitatively controlled independently of the precision of the shape. As concrete examples of photo-setting resins, UV1000, UV2000, and UV3000 of Mitsubishi Chemical Corp., Kayarad of NIPPON KAYAKU Co., Ltd., MR-6 and MR-7 of Mitsui Chemicals Inc., etc. can be noted, and by optimizing the intensity of the applied UV ray, these resins can be hardened in two or three minutes.

Further, the optical element may be made of a glass material. In this case, as the manufacturing methods of optical elements using a glass material, press forming, grinding, polishing, glass mold forming, etc. are cited, and in particular, in the case where it is formed by glass mold forming, following effects can be obtained.

That is, in the case where an optical element is made of a glass material and manufactured by glass mold forming, a material having a very high hardness and difficulty of working such as a ceramic or a WC alloys material is selected for the die material because a high heat resistance is required for it. In order to make also the surface roughness of an optical element formed by glass molding be of good quality without scattering, it is necessary to control also the surface roughness of the optical surface Ra of the die to be 5 nm or less. Every die material is one that is composed of powders sintered and made solid, and in particular, in a ceramic material, all the particles are crystallized and the whole body is sintered in a polycrystalline state; therefore, the structural independency of the particles is strong, even a clearance at a particle boundary and falling off of a particle are observed after polishing, and a small hole called a pit is observed on the surface. A glass lens formed by such a die has necessarily an optical surface with a coarse surface roughness, to make a cause of scattering the used light. Especially, in the case where the used light source has a short wavelength of 500 nm or less, this optical surface scattering becomes remarkable, and a loss of light quantity reaching several percent and a stray light is generated. Accordingly, it is difficult to suppress this by using a general ceramic material; therefore, by employing a WC alloys material having a low independency of grain boundaries or coating the surface with a material having a similar coefficient of linear expansion by a CVD process or the like and carrying out the molding using this, optical elements having the above-described optical surface can be efficiently manufactured.

In the both cases where an optical element is made of a resin material and where it is made of a glass material, the amount of scattered light can be effectively reduced for at least a light having a wavelength of 400 nm, by it that at least one of the aforesaid optical surfaces has a reflectance of 5% or less for at least a light having a wavelength of 400 nm. Further, it is desirable that at least one of the optical surfaces has a transmittance of 90% or over (more desirably 95% or over) for a light having a wavelength of 400 nm.

Further, the amount of scattered light for a light having such a short wavelength as falling within a range of 300 to 500 nm can be reduced effectively by it, that at least one of the aforesaid optical surfaces has a reflectance of 3% or less for a light having a wavelength falling within a range of 300 to 500 nm. In addition, "reflectance" in this specification means the reflectance including the surface reflectance (determined by the difference between the refractive indices), the reflectance owing to scattering, and the reflectance owing to diffraction.

Further, it is desirable that at least one of the optical surfaces has a transmittance of 97% or over for a light having a wavelength falling within a range of 300 to 500 nm.

Further, a polishing process is not applied to the optical surface of the above-described optical element. A polishing process is usually carried out depending on the physical function of a person of technical skill by manual operation. A polishing process as an after-processing of a cutting process or a grinding process can not make the surface roughness sufficiently small, and it is very inefficient because the operation time reaches nearly one hour even for an optical surface of a die having a diameter of 10 mm or so. In this invention, "a polishing process is not applied" means that a polishing process as described in the above is not applied.

Further, by using the above-describe optical element for an optical system of an optical pickup, following effects can be obtained. For an optical element in an optical system of an optical pickup, a very high-precision of the shape of the optical surface (the shape error of 50 nm or less) is required, and in the case where a light source having a short wavelength of 500 nm or less is used, a very slight inferiority of the surface roughness of the optical surface causes a large amount of scattered light to be produced, which reduces the light quantity for reading and writing pits on an optical disk which is the object of reading and writing, and generates a stray light to lower the SN ratio at the light converging point; however, in an optical system in which an optical element of this invention as described in the above is employed, the SN ratio at the light converging point on the optical disk for reading and writing is improved, and an error in reading and writing is effectively reduced, because the amount of the scattered light is decreased and the stray light is also reduced. It is desirable that an optical element of this invention is a lens. Further, this invention can be applied to a diffraction lens and a lens having a step on the lens surface as an optical element.

In this case, if the above-described optical element is a collimator lens in the above-described optical system of an optical pickup, following effects can be obtained. A collimator lens is disposed comparatively in the direct neighborhood of the light source, and compared to other optical elements, it has a larger degree of loss of light quantity owing to scattering and diffraction, to give a large influence to the whole pickup optical system. However, the scattered light and the diffracted light by the optical surfaces of the collimator lens are reduced owing to the effect of this invention; therefore, it is desirable because the intensity of the converged light on an optical disk can be made high, and for example, the intensity of the light input to a light receiving sensor in an optical pickup device can be also made high.

Further, if the aforesaid optical element is an objective lens in the above-described optical system of an optical pickup, the scattered light and the diffracted light by the optical surfaces can be reduced, and the SN ratio at the light converging point on an optical disk is improved, while information signal can be clearly picked up; therefore, jitter owing to an eye-pattern etc. is made small, and correction for detection error etc. also becomes small, to make it possible to improve the pickup performance and its reliability.

Further, if the aforesaid optical element is an optical element for a sensor in the above-described optical system of an optical pickup, the SN ratio of the detection signal in the sensor can be kept high, to improve the servo-characteristics of auto-focusing, auto-tracking, etc.

By using an optical element as described in the above in an optical pickup device comprising a light source having a central wavelength of 500 nm or less, scattered light is decreased and an error in reading and writing can be prevented. In this case, by using the optical element for the collimator lens, the objective lens, and the optical element for the sensor in the optical system of the optical pickup device, the same effect as described in the above can be obtained.

Further, an optical system of this invention comprises at least one optical element having an optical surface with a center-line mean roughness Ra of 5 nm or less.

By this optical system, because it comprises an optical element of this invention, it can be actualized an optical system which is capable of reducing the amount of scattered light especially for a light having a short wavelength.

In this case, it is possible to let the aforesaid optical element be the collimator lens, the objective lens, or the optical element for the sensor in the above-described optical system.

By using the above-described optical system as an optical system of an optical pickup, the same effect as described in the above can be obtained.

Further, by letting every one of the optical elements included in the above-described optical system be an optical element having on both sides an optical surface with a center-line mean roughness Ra of 5 nm or less, scattered light can be more effectively reduced for a light having a short wavelength.

Moreover, by using the above-described optical system in an optical pickup device comprising a light source having a central wavelength of 500 nm or less, especially for a short-wavelength light having a central wavelength of 500 nm or less, scattered light can be decreased, and the SN ratio on the light converging point on an optical disk as the object of reading and writing is improved, to make it possible to prevent an error in reading and writing.

Besides, according to an optical system comprising at least one of the above-described optical elements, it can be actualized an optical system which is capable of reducing scattered light especially for a light having a short wavelength.

Further, an optical pickup device of this invention, which carries out recording and/or reproducing of information to and/or from an optical information recording medium, comprises a light source emitting a bundle of rays having a central wavelength of 500 nm, a convergent optical system for converging the bundle of rays emitted from the laser light source onto the information recording surface of the optical information recording medium (in the case where the optical information recording medium has a transparent substrate, through the transparent substrate), and a light detector for detecting the bundle of rays reflected by the optical information recording medium or the bundle of rays transmitted through the optical information recording medium. Further, the convergent optical system or the light detector comprises at least one optical element, and the optical element has at least one optical surface with a center-line mean roughness Ra of 5 nm or less. The detail of the optical element is the same as described in the foregoing. In addition, with respect to the information recording medium, this invention can be applied to a conventional CD, DVD, MD, and MO can be used, and it is desirable to use an optical information recording medium to which a bundle of rays having a wavelength of 500 nm or less (desirably 400 nm or less) is applied for recording and/or reproducing information. Incidentally, the optical information recording medium may or may not comprise the transparent substrate. For the light detector, a general photo-detector can be employed, and a PD, CCD, and CMOS can be used, but it should not be limited to these.

According to this pickup device, especially for a short-wavelength light having a central wavelength of 500 nm or less, scattered light is reduced, and the SN ratio at the light converging point on an optical disk as the object of reading and writing is improved, to make it possible to prevent an error in reading and writing.

In this case, it is possible to let the aforesaid optical elements be the above-described optical element.

Further, the optical pickup device can be made up in a manner such that it comprises the above-described optical system.

Besides, an optical information recording/reproducing apparatus of this invention which carries out the recording and/or reproducing of information on and/or from an optical information recording medium comprises an optical pickup device. The optical pickup device is the same as described in the above. Further, the optical information recording/reproducing apparatus may comprise a spindle motor, an actuator for moving the optical pickup device, etc.

Further, a molding die of this invention has a molding surface with a center-line mean roughness Ra of 5 nm or less. By this molding die, a molding object having a very small surface roughness can be obtained.

Further, a molding die of this invention has an optical surface molding surface with a center-line mean roughness Ra of 5 nm or less. Further, another molding die of this invention has a first optical surface molding surface with a center-line mean roughness Ra of 5 nm or less and a second optical surface molding surface with a center-line mean roughness Ra of 5 nm or less provided opposite to said first optical surface molding surface. According to these molding dies, an optical element of this invention can be obtained.

Further, the above-described molding surface with a center-line mean roughness Ra of 5 nm or less can be made aspherical. In this case, a molding object having an aspherical surface can be obtained.

Further, by making aspherical the above-described optical surface molding surface with a center-line mean roughness Ra of 5 nm or less, or by making aspherical at least one of the above-described first optical surface molding surface and the second optical surface molding surface, an optical element of this invention having at least one of the optical surfaces made aspherical can be obtained.

Besides, by making aspherical both of the above-described first optical surface molding surface and the second optical surface molding surface, an optical element of this invention having both optical surfaces made aspherical.

In the following, embodiments of this invention will be explained with reference to the drawings. FIG. 1 is a vertical cross-sectional view showing the outline of the structure of a molding die for a lens showing an embodiment of this invention, and FIG. 2 is a cross-sectional view of an objective lens having an aspherical surface formed by the molding die shown in FIG. 1.

As shown in FIG. 1, the molding die is provided with the upper die 11 and the lower die 12, and the molding surface 11a of the upper die 11 and the molding surface 12a of the lower die 12 correspond the shape of the optical surfaces of the lens 1 to be molded respectively. A suitable amount of a molten thermoplastic resin, for example, is inserted between the upper die 11 and the lower die 12, the upper die is pressed to the lower die 12, and by opening the die to take out the lens 1 after cooling, the lens 1 can be manufactured by molding.

Figure 2:
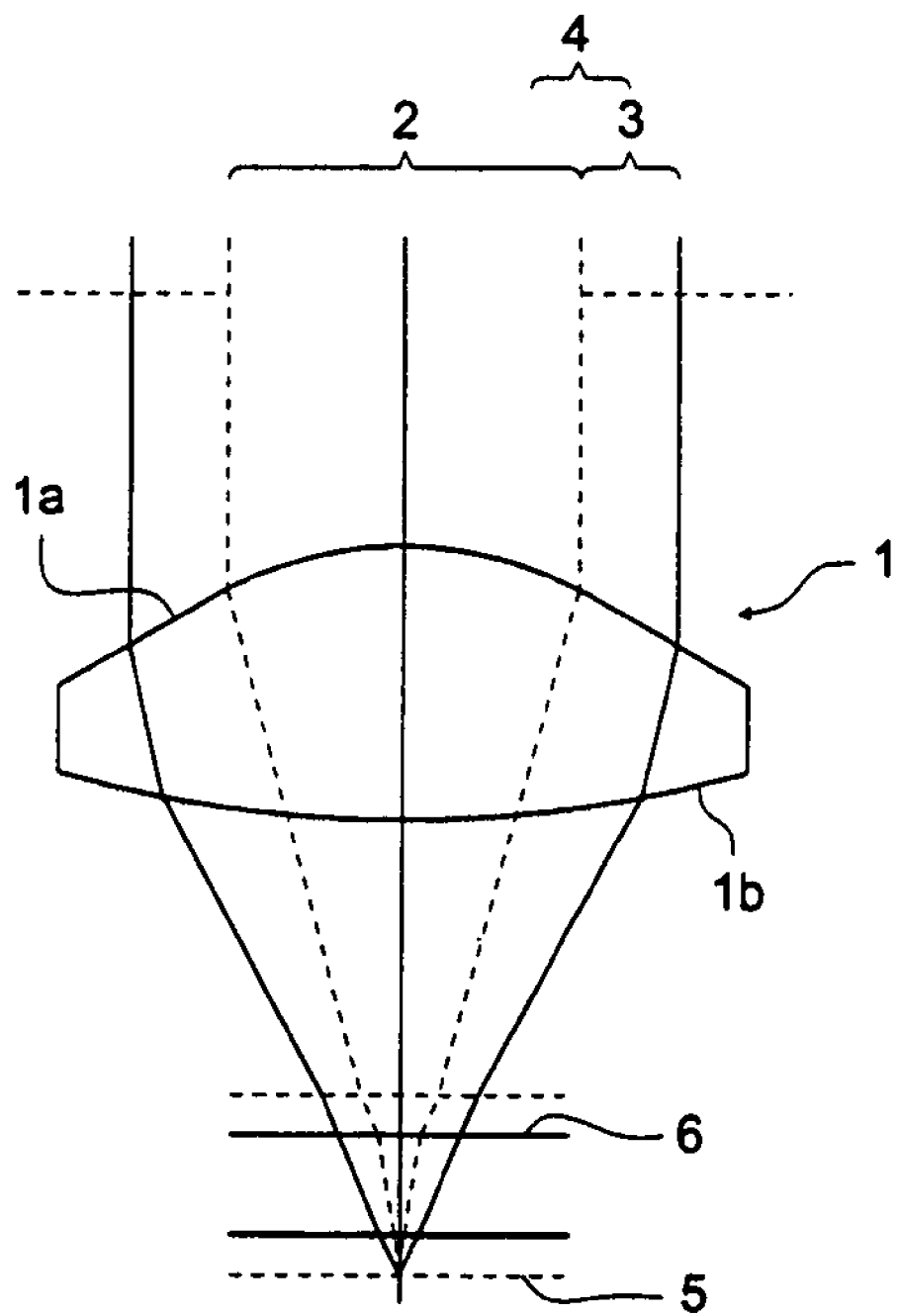
FIG. 2 is a cross-sectional view of an objective lens which is an optical element based on an embodiment of this invention, is formed with the molding die shown in FIG. 1, and has at least both optical surfaces formed to be aspherical and to have a center-line mean roughness Ra of 5 nm or less.

As shown in FIG. 2, the lens 1, which is molded by the molding die shown in FIG. 1, has the optical surface 1a formed by the molding surface 11a of the upper die 11 and the optical surface 1b formed by the molding surface 12a of the lower die 12. The optical surfaces 1a and 1b are formed corresponding to the surface shape and the surface roughness of the molding surface 11a of the upper die 11 and the molding surface 12a of the lower die 12 respectively. That is, the surface states of the molding surfaces 11a and 12a are transferred respectively to the optical surfaces 1a and 1b nearly as they are.

The lens 1 shown in FIG. 2 is made up of an objective lens which is applicable suitably for both of the first optical disk 5 (from which information is read by a light from a light source having a wavelength of 500 nm) shown by the broken line, and the second optical disk 6 (from which information is read by a light from a light source having a wavelength of 400 nm) in order that it can form a focus on both of them to make it possible to read information from them. For this reason, as shown in FIG. 2, the optical surface 1a of the lens 1 is formed aspherical as a whole, and the common area 2 is formed in the central portion in the neighborhood of the optical axis, and the dedicated area 3 for the optical disk 6 is formed outside the common area 2 with the border area 4 located between them. Further, also the optical surface 1b of the lens 1 is formed aspherical as a whole although it is more gentle than the optical surface 1a.

The both optical surfaces 1a and 1b of the lens 1 shown in FIG. 2 is formed by a molding die as shown in FIG. 1, and the center-line mean roughness Ra of the both optical surfaces 1a and 1b is equally 5 nm or less. Therefore, by this objective lens 1, scattered light can be reduced especially for a light having short wavelength of 500 nm or less.

In the following, another lens will be shown as a modified example with reference to FIG. 13. This lens 40 is a dual optimum substrate thickness lens, is provided with the first objective lens portion 41 formed in the central portion, the ring zone phase shifter 42 formed around it like a groove, and the second objective lens portion 43 provided in the outer peripheral area of the ring zone, and has a structure such that it can be used commonly for optical disks having different thickness values of the substrate respectively. Each of the optical surfaces 40a, 41a, 42a, and 43a of this lens 40 is formed to have a center-line mean roughness Ra of 5 nm or less; therefore, by this lens 40, scattered light can be reduced especially for a light having a short wavelength of 500 nm or less.

An optical element as described in the above such as the lens 1 and 40 is generally formed, in the case where a thermoplastic resin is used as a molding resin material, by injection molding; however in some cases, it may be formed by compression injection molding in which the molding surface is transferred with a high precision by applying a compressing force to the cavity between the upper die and the lower die. Further, it may be employed a molding method in which a heat cycle is incorporated in order that a high-precision transfer may be done by varying the temperature of the molding die after filling it up with a thermoplastic resin. The optical element of this invention is an optical element having an optical surface with the center-line mean roughness Ra made to satisfy Ra≦5 nm, in particular 0.5 nm≦Ra≦5 nm, regardless of its method of forming.

Further, for the material of the optical element, it is not limited to a thermoplastic resin, but it may be a thermosetting resin or a photo-setting resin, or further, it may be an optical glass. In the case of a thermosetting resin, a molding die with its optical surface (molding surface) processed as in the case of a thermoplastic resin is filled with a liquid resin at room temperature, and after that, the resin is set in the molding die which is heated to a temperature around 150° C. or kept at a constant temperature, to form an optical element.

Further, in the case of a photo-setting resin, a part of the molding die is made of a material transmitting a UV ray such as a glass, and after the molding die is filled with a liquid resin at room temperature, a UV ray is applied to make the resin be set, to form an optical element.

As stated above, if the different kind of the resin material is used, the optical element of the present invention can be obtained by the molding without conducting the post process such as a polishing process.

Further, also by a glass molding method in which an optical element is formed by pressing from an optical glass in a molten state by heating, the optical element of this invention can be obtained without applying an after processing such as polishing likewise.

In the following, two examples of an optical system of an optical pickup and an optical pickup device including an optical element as described in the above having an optical surface with a center-line mean roughness Ra of 5 nm or less will be explained with reference to FIG. 8 and FIG. 9.

Figure 8:
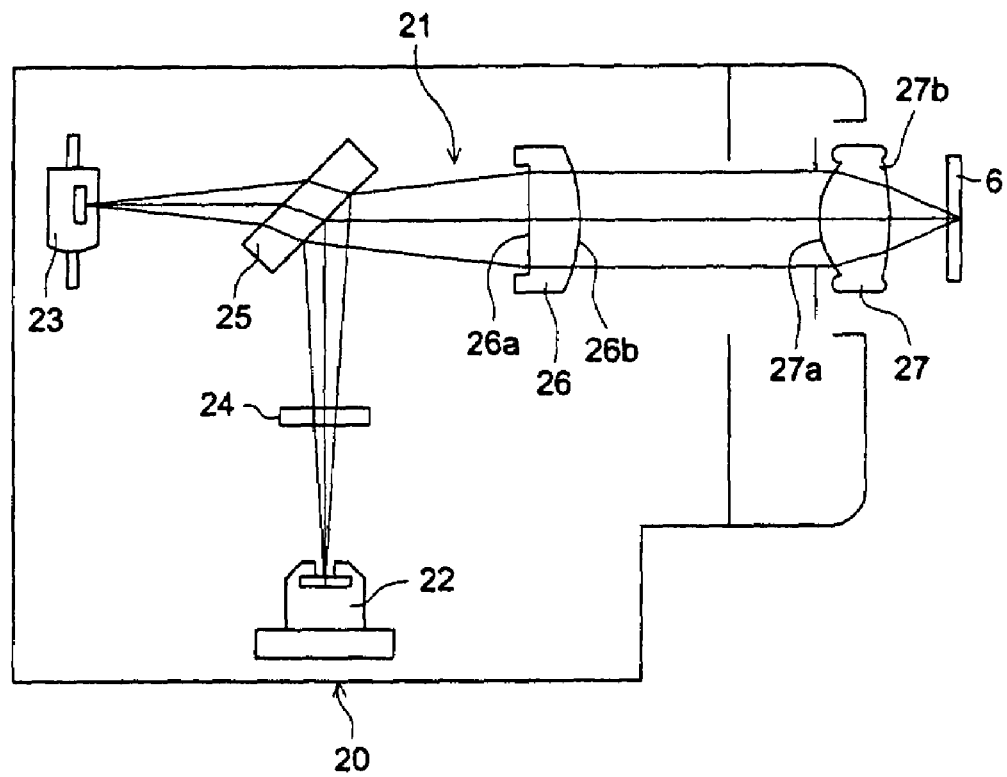
FIG. 8 is a drawing showing an optical system for an optical pickup and the outline of an optical pickup device including this optical system based on an embodiment of this invention.

The optical pickup device 20 shown in FIG. 8 is provided with the optical system for an optical pickup 21, the light source 22 composed of a laser diode emitting a light having a central wavelength of 400 nm, and the light receiving sensor 23 composed of a photodiode, and has a structure such that information can be read from the optical disk 6 by a short-wavelength light having a wavelength of 400 nm. Further, the optical pickup device 20 is provided with an auto-focusing servo-mechanism (omitted in the drawing) in order that it may automatically make focusing by moving in the lateral direction in FIG. 8 with respect to the optical disk 6, and an auto-tracking servo-mechanism (omitted in the drawing) in order that it may automatically move in the vertical direction in FIG. 8.

The optical system for an optical pickup 21 is provided with the diffraction grating 24 for diffracting the laser beam from the light source 22, the beam splitter 25 for reflecting the beam from the diffraction grating 24 toward the optical disk 6 and transmitting the beam from the optical disk 6 toward the light receiving sensor 23, the collimator lens 26 for making the beam reflected by the beam splitter 25 a parallel beam, and the objective lens 27 for converging the parallel beam from the collimator lens 26 on the optical disk 6.

Among the optical elements 24 to 27 composing this optical system for an optical pickup 21, regarding the collimator lens 26 and the objective lens 27, both of the optical surfaces 26a and 26b and both of the optical surfaces 27a and 27b are formed to have a center-line mean roughness Ra of 5 nm or less.

According to the optical pickup device 20 shown in FIG. 8, the information of the optical disk 6 can be read by it, that the laser beam from the light source 22 is diffracted by the diffraction grating 24, is reflected by the beam splitter 25, and after being made a parallel beam by the collimator lens 26, is focused on the optical disk 6 in rotating by the objective lens 27 to be converged, and this converged beam is reflected by the optical disk 6, passing reverse way the above-described path, further passing the beam splitter 25, is received by the light receiving sensor 23, to have its intensity converted into an electrical signal.

In this case, the collimator lens 26 is disposed comparatively in the direct neighborhood of the light source 22, and compared to other optical elements, it has a larger degree of loss of light quantity owing to scattering and diffraction, to give a larger influence to the whole pickup optical system; however, because the both optical surfaces 26a and 26b of the collimator lens 26 is formed to have a center-line mean roughness Ra of 5 nm or less, the generation of scattered light and diffracted light by the optical surfaces 26a and 26b is reduced, and owing to this, the intensity of the converged light on the optical disk 6 can be made high, and also the intensity of the light inputted to the light receiving sensor 23 is high, to cause an error in reading to be difficult to happen.

Further, because the objective lens 27 has its both optical surfaces 27a and 27b formed to have a surface roughness Ra of 5 nm or less, to reduce the generation of scattered light and diffracted light, the intensity of converged light on the optical disk 6 is made high to improve the SN ratio. Further, because the information from the optical disk can be clearly read, the jitter owing to an eye-pattern etc. is reduced, and the correction for a detection error etc. is small, to make it possible to enhance the pickup performance and its reliability.

Besides, each of the optical surfaces of the diffraction grating 24 and the beam splitter 25, which are other optical elements in the optical system for an optical pickup 21, may be formed to have an Ra exceeding 5 nm; however, if they are formed to have an Ra of 5 nm or less, a further remarkable effect of this invention can be obtained.

In the following, another pickup device will be explained with reference to FIG. 9. This optical pickup device 30 is made up as one of a common use type which is capable of reading two different kinds of optical disks by a single device, and is provided with the optical system for an optical pickup 31, the first light source 33 composed of a laser diode emitting a beam having a central wavelength of 500 nm, the second light source 32 composed of a laser diode emitting a beam having a central wavelength of 400 nm, and the light receiving sensor 34 composed of a photodiode.

The optical pickup device 30 has a structure such that, when the first optical disk 5 is set, its information is read by a short-wavelength beam having a wavelength of 500 nm from the first light source 33, and when the second optical disk 6 is set, its information is read by a short-wavelength beam having a wavelength of 400 nm from the second light source 32. Besides, the optical pickup device 30 is provided with an auto-focusing servo-mechanism (omitted in the drawing) and an auto-tracking servo-mechanism (omitted in the drawing) in the same manner as the device shown in FIG. 8.

The optical system for an optical pickup 31 is provided with the diffraction grating 35 for diffracting the laser beam from the first light source 33, the first beam splitter 37 for reflecting the beam from the diffraction grating 35 toward the optical disk 5 or 6 and transmitting the beam from the optical disk 5 or 6 toward the light receiving sensor 34, the second beam splitter 38 for reflecting the beam from the second light source 32 toward the optical disk 5 or 6 and transmitting the beam from the optical disk 5 or 6 toward the light receiving sensor 34, the collimator lens 39 for making the beam reflected by the first or the second beam splitter 37 or 38 a parallel beam, the objective lens 40 for converging the parallel beam from the collimator lens 39 on the optical disk 5 or 6, and the sensor lens 36 for converging the beam on the light receiving sensor 34. The objective lens 40 can be made up of one shown in FIG. 2.

Among the optical elements 35 to 40 composing this optical system for an optical pickup 31, regarding the collimator lens 39 and the objective lens 40 and the sensor lens 36, both of the optical surfaces 39a and 39b and both of the optical surfaces 40a and 40b and both of the optical surfaces 36a and 36b are formed to have a center-line mean roughness Ra of 5 nm or less.

Figure 9:
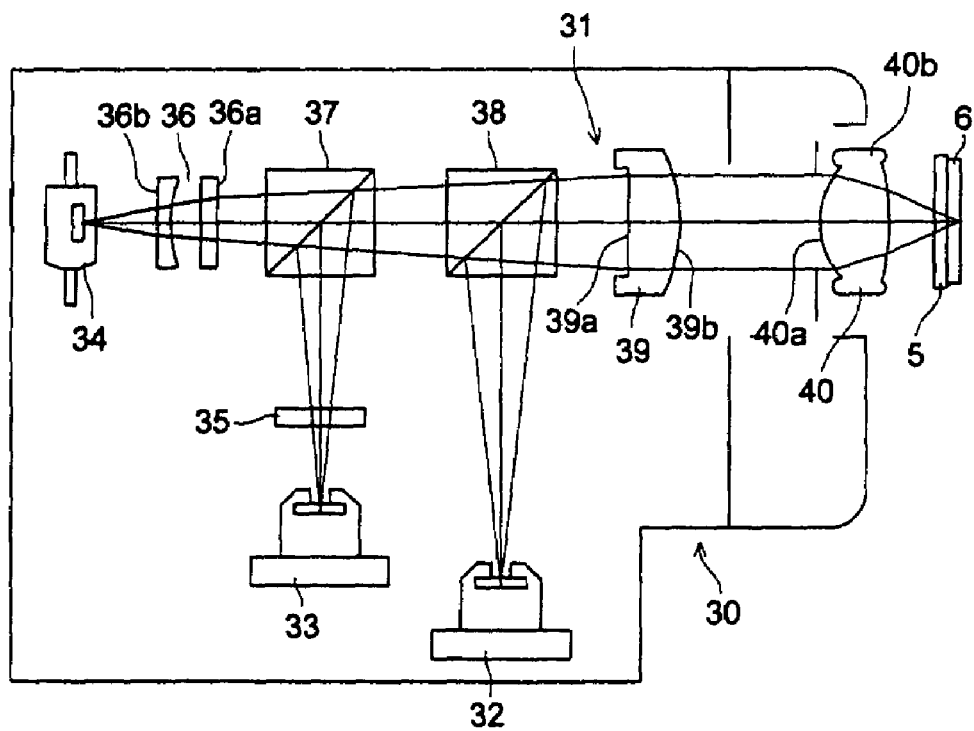
FIG. 9 is a drawing showing an optical system for an optical pickup other than the one shown in FIG. 8 and the outline of an optical pickup device including this optical system.

According to the optical pickup device 30 shown in FIG. 9, when the first optical disk 5 is set in the device, the information of the first optical disk 5 can be read by it, that the laser beam from the first light source 33 is focused to be converged on the optical disk 5 in rotating, through the diffraction grating 35, the first beam splitter 37, the second beam splitter 38, the collimator lens 39, and the objective lens 40, and this converged beam is reflected by the first optical disk 5, then the reflected beam passing reverse way the above-described path, is converged by the sensor lens 36, and is received by the light receiving sensor 34, to have its intensity converted into an electrical signal.

When the second optical disk 6 is set in the device, the information of the second optical disk 6 can be read by it, that the laser beam from the second light source 32 is focused to be converged on the optical disk 6 in rotating, through the second beam splitter 38, the collimator lens 39, and the objective lens 40, and this converged beam is reflected by the second optical disk 6, then the reflected beam passing reverse way the above-described path, is converged by the sensor lens 36, and is received by the light receiving sensor 34, to have its intensity converted into an electrical signal.

In this case, because the collimator lens 39 and the objective lens 40 have the respective optical surfaces 39a and 39 and 40a and 40b formed to have a center-line mean roughness Ra of 5 nm or less, the generation of scattered light and diffracted light by each of the optical surface is reduced, and the same effect as the device shown in FIG. 8 such as preventing an error in reading can be obtained.

Further, because the sensor lens 36 has its both optical surfaces 36a and 36b at its both outer sides formed to have a surface roughness Ra of 5 nm or less, the generation of scattered light and diffracted light by the sensor lens 36 is reduced, and it is possible to keep high the SN ratio of the detection signal, to improve the servo-characteristics for auto-focusing, auto-tracking, etc.

Besides, each of the optical surfaces of the diffraction grating 35 and the beam splitters 37 and 38, which are other optical elements in the optical system for an optical pickup 31, may be formed to have an Ra exceeding 5 nm; however, if they are formed to have an Ra of 5 nm or less, a further remarkable effect of this invention can be obtained.

Figure 3:
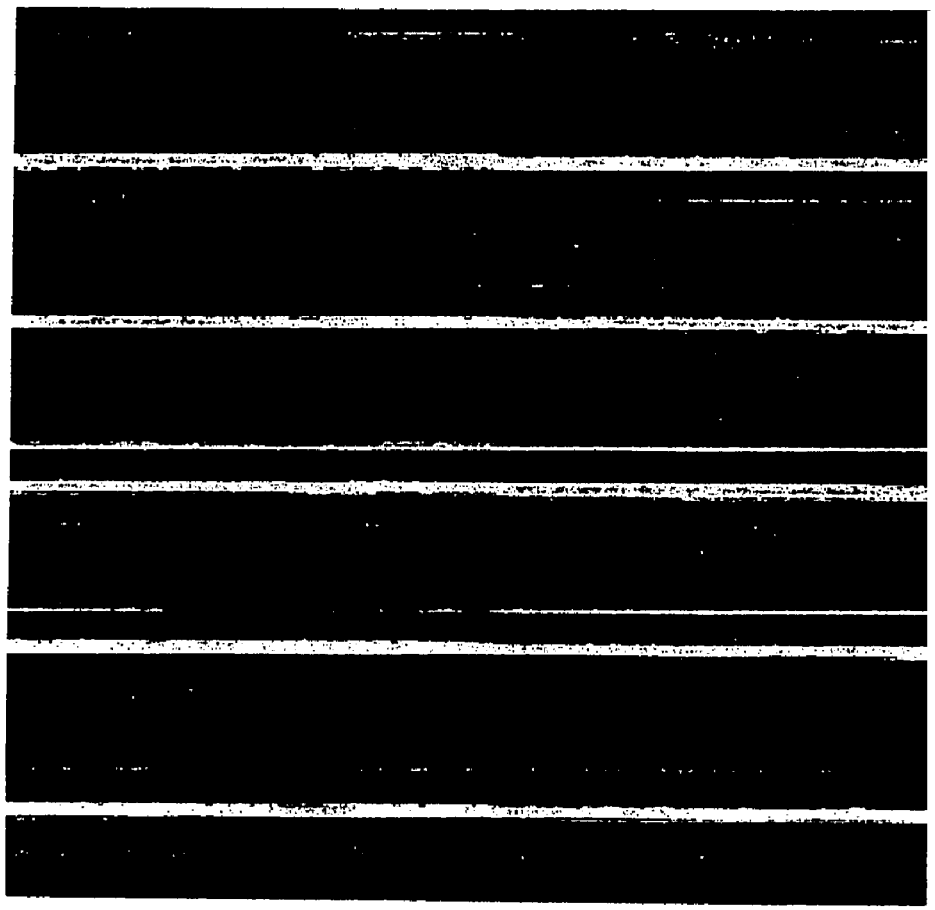
FIG. 3 is a drawing showing the appearance of a cut surface of the optical surface (molding surface) of a molding die based on an embodiment of this invention.

In the following, the method of forming the optical element of this invention will be explained. In FIG. 1, FIG. 2, and FIG. 3, the surface state of each of the molding surfaces 11a, 12a, etc. of the molding dies is transferred nearly as it is to each of the optical surfaces 1a, 1b, and 40a to 43a of the lenses; therefore, the surface roughness of the optical surfaces 1a, 1b, and 40a to 43a depends on the surface roughness of the molding surfaces 11a, 12a, etc. of the molding dies. Accordingly, first of all, the points of problem in the conventional molding method will be explained below in detail.

In the method of forming the optical surface of the optical element used in a conventional optical system for an optical pickup, for a plastic molding lens, the optical surface transferring surface of a molding die which is made by electroless nickel plating etc. has been cut-processed with a super-precision lathe and a diamond tool. In this case, the roughness of the worked surface depends on the four factors, that is, the motion precision of the super-precision lathe used, the precision of the diamond tool, the conditions of cutting, and the material of the die.

Next, the points of problem in the method of forming the optical surface (molding surface) of a molding die for mold-transferring the optical surface of a conventional molded optical element is to be described.

1. Die Material: Electroless Plating (ENP)

Figure 10:
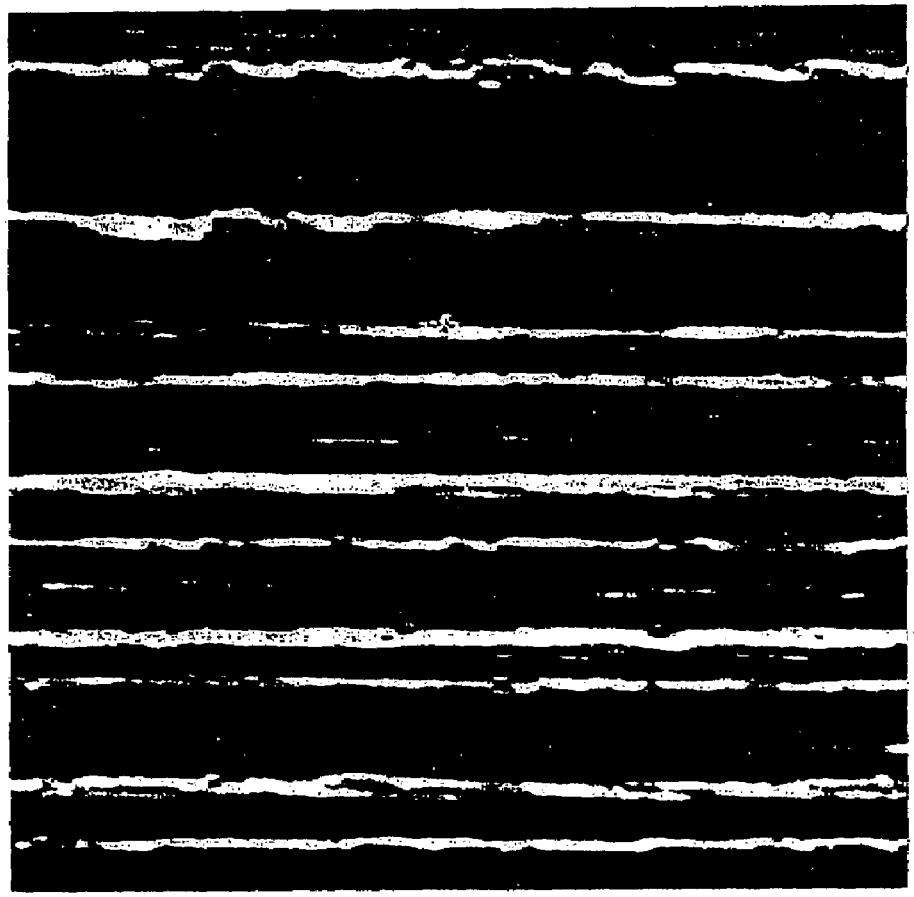
FIG. 10 is a drawing showing the appearance of the cut surface of an ENP optical surface (molding surface) of a molding die by a conventional cutting method.
Figure 11:
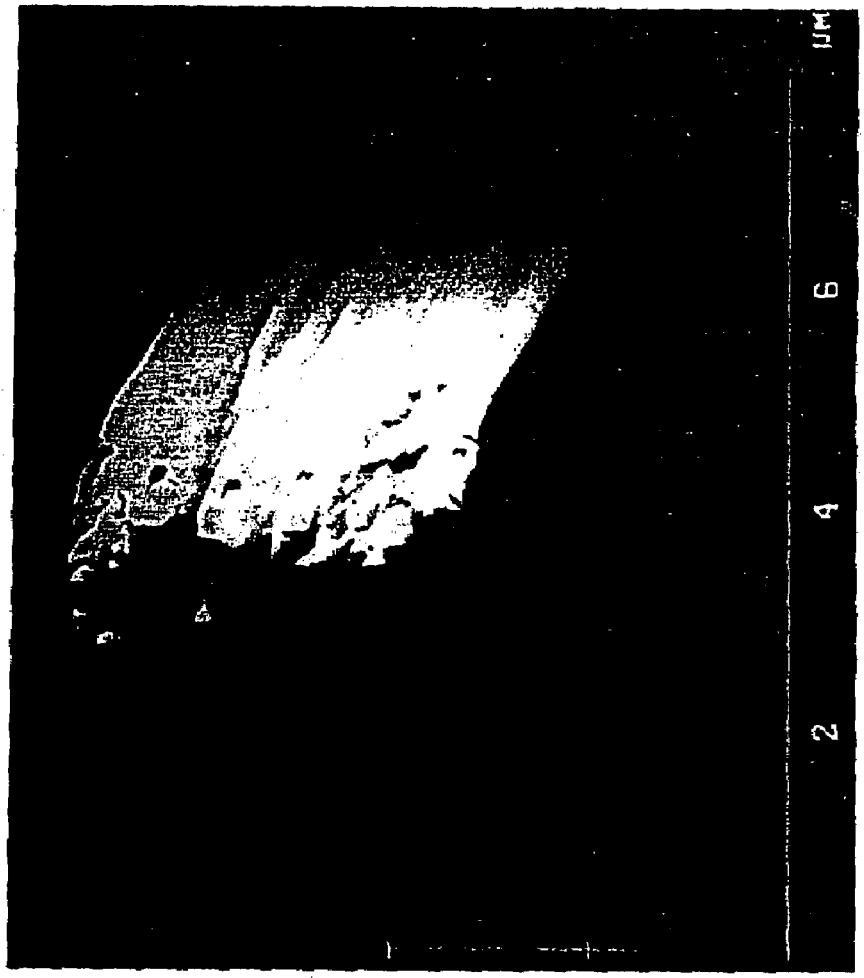
FIG. 11 is a drawing showing the appearance of the edge portion of the cutting diamond tool used in forming the cut surface of the ENP optical surface (molding surface) of the conventional molding die shown in FIG. 10.

Heretofore, the most general material of a die for molding an optical surface (molding surface) is the layer of an electroless nickel plating (hereinafter referred to as ENP) formed to a thickness of 100 µm or so on a steel material. By cutting this plating layer with an R diamond tool having a rake face of a circular shape using a super-precision double axes lathe, the optical surface (molding surface) of a molding die has been obtained. FIG. 10 shows the result of observing the surface of an ENP cut with a diamond tool by an atomic force microscope (AFM), and the length of cutting is about 3 km. On the cut surface, there are produced ruggedness and plucked portions of several nm, to show that the cutting is not done so perfectly for a working of the nm order. The state of edge point of the R diamond tool at this time is shown in FIG. 11. The left side in FIG. 11 shows the flank and the right side shows the rake face. It is shown that the edge which was sharp in the initial state has a lot of chips produced and has been worn, and the ridge portion forming the cutting surface retreats about 100 nm toward the center of the tool. In the state of the ridge retreating unevenly in this way, the amount of wear is different depending on the position in the edge, and the correctness of circle shape of the rake face during cutting can not be maintained. That is, whatever a tool having an initially good roundness of the rake face may be used, so long as a conventional ENP is used for a molding die material, the edge shape is easily varied during the forming process of the optical surface (molding surface), which makes it impossible to obtain a high-quality optical surface of a molding die with a surface roughness corresponding to the initial precision of the edge over the whole area.

2. The Roundness of the Rake Face of an R Diamond Tool

Figure 12:
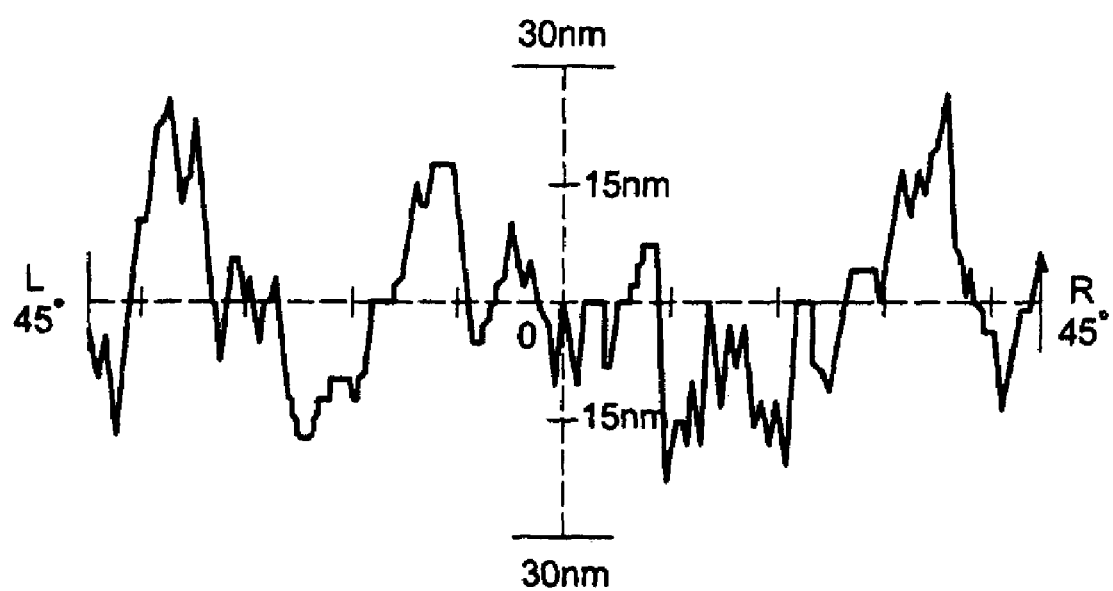
FIG. 12 is a drawing showing the result of measuring the roundness of the rake face of the edge of the conventional cutting diamond tool shown in FIG. 11.

In the above-described R diamond tool, it has been considered important for obtaining the high-precision optical surface of a molding die that the roundness of the tool is good, because the roundness of its rake face is directly transferred by cutting as the precision of the working optical surface. As explained in the above, in the case where an ENP which gives a remarkable wear to a tool, it is meaningless to make the roundness of the tool 50 nm or less; however, generally speaking, it is still a necessary condition for obtaining an optical surface having a good surface roughness that the ridge line of the cutting edge of an R diamond tool has no chip and is sharp as a result of precisely polishing the rake face and the flank of the tool for making the tool roundness good. In FIG. 12, it is shown the roundness of the ridge line of a conventional R diamond tool. The abscissa represents the angle of the line drawn to a position on the ridge line from the center made with the central line in the rake face taken to left and right with the central point of the edge made 0°. Portions with large ruggedness are to be seen in several points, to show that the cutting edge is not even. Further, also from the view point to form the optical surface to have a high-precision shape, it is considered necessary to make an objective lens etc. for use in a high-density optical recording of next generation have a roundness of 30 nm or less with other error factors also taken into consideration; however, a conventional R diamond tool has a roundness of 50 nm or so.

3. Machine Tool (Super-Precision Lathe)

FOR the above-described reasons, it is required for a machine tool a motional precision to make it possible to form a sufficiently small surface roughness. Further, a high reproducibility of processing is especially important for the high-precision diamond lathe processing to be significant as a die processing technology for mass production. That is, it is required for a machine tool to be capable of maintaining the relative positional relation between the molding die and the tool with a high precision and actualizing a super-high motional precision with a good reproducibility, without being influenced by external disturbing factors such as temperature and air pressure changes.

The surface roughness when an aluminum alloy S3M is cut to a flat surface with a conventional representative super-precision lathe has been expressed by Rtm≅10 nm. In the case where an electroless nickel plating, which is a material for an actual molding die, is cut-processed, the surface roughness of the optical surface has been expressed by Rtm=30–50 nm, and Ra=10–15 nm. Therefore, the optical surface of an optical element mold-transferred by this molding die has a surface roughness of approximately this degree, and by the processing of an optical surface based on such a conventional method, it can not be obtained by only a diamond cutting process, an optical element having a small amount of scattered light of an optical system in an optical pickup device for an optical disk of next generation provided with a light source having a short wavelength of 500 nm or 400 nm. Further, heretofore, for the purpose of improving the apparent quality such as erasing cutter marks on the optical surface, in some part of this field, a polishing process mainly based on a manual operation has been applied to the molding die after diamond cutting. However, because cutter marks are deep owing to the above-described factors by conventional diamond cutting, and therefore the amount of removed material by the polishing in the optical surface is large, which causes it often to occur that the shape of the optical surface (molding surface) which has been formed with effort is destroyed. First of all, this polishing process does not aim at the reduction of scattered light of a short-wavelength light source; therefore, it has a remarkable influence to deteriorate the optical performance owing to the destruction of the shape of the optical surface in proportion to the wavelength being made short especially in a optical system using a short-wavelength light source, and a polishing process as described in the above as an after processing based mainly on a manual operation has posed a problem on efficiency and quality in manufacturing a die with a definite precision of the optical surface maintained.

For the above-mentioned reasons, by the processing of the molding die for an optical element based on conventional diamond cutting, it is very difficult to obtain an optical surface of an optical element in a pickup optical system using a short-wavelength light source having a small amount of scattered light, with the precision of the shape of the optical surface kept high.

As described in the above, according to the study of the inventors, it is made clear that, because the scattered light quantity is increased by an amount of about ten times from the level of conventional CD's in the case where the wavelength of the used light is 400 nm, the surface roughness of an optical surface of an optical element should satisfy at least Rtm<30 nm, and Ra (center-line mean roughness)≦5 nm (desirably 3 nm); however, because the surface roughness of the optical surface (molding surface) in the processing of a molding die, which determines the surface roughness of the optical surface of an optical element, is considered as depending on the above-described mutually combined four factors, it has been found that it is necessary to make an improvement for all over these factors simultaneously in parallel.

Figure 13:
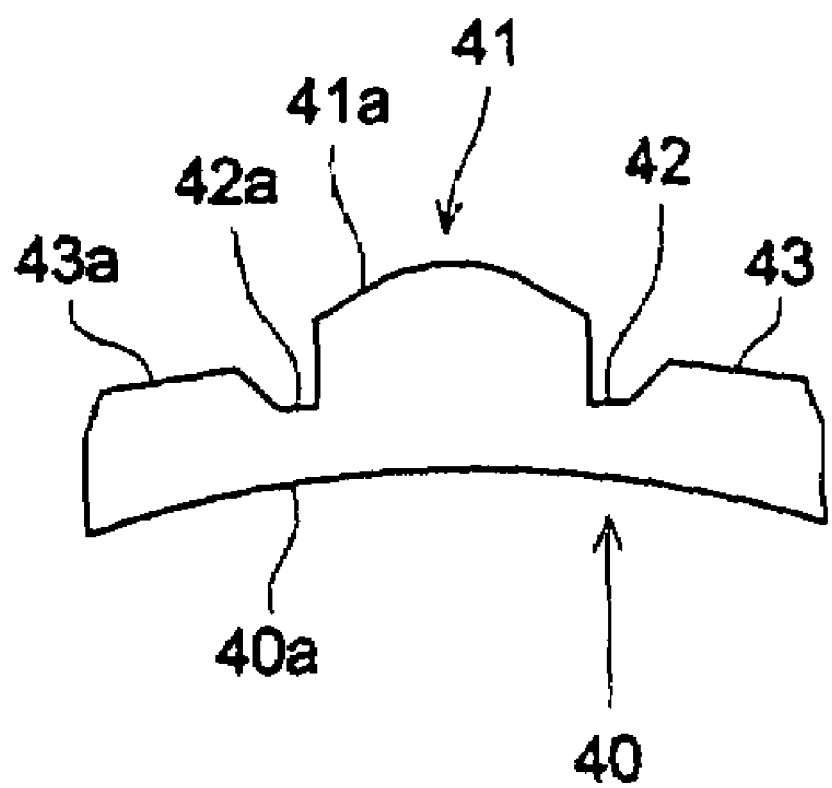
FIG. 13 is a cross-sectional view of another optical element based on an embodiment of this invention.

As described in the above, as a result of studying the above-described problems of the conventional technology, by making original ideas and contrivances as will be described in the following simultaneously and in parallel, in order to form lenses as shown in FIG. 2 and FIG. 13 etc., the inventors has succeeded in forming it by only cutting, the optical surface (molding surface) of a molding die, which is aspherical or other and extremely so smooth as never found, having the surface roughness expressed by Rtm<5 nm, and Ra<1 nm.

Figure 4:
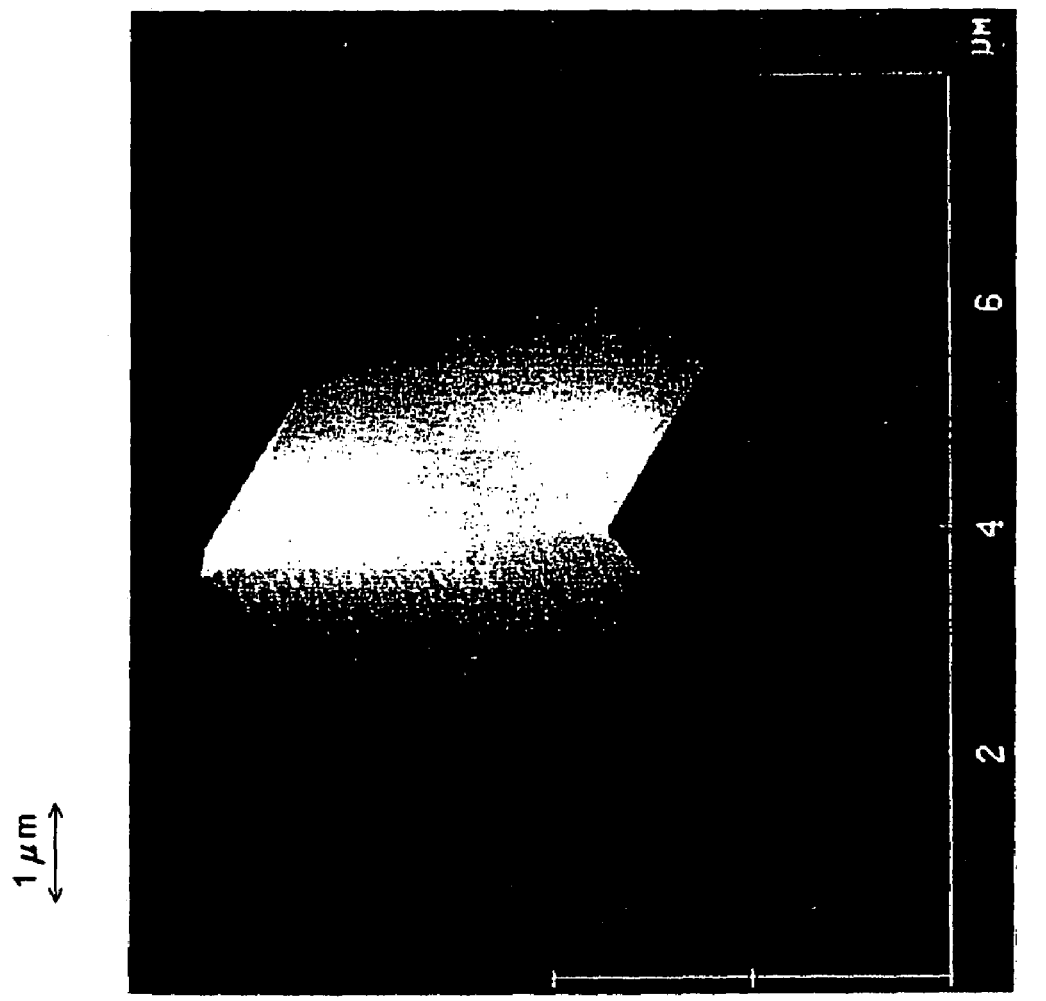
FIG. 4 is a drawing showing the appearance of the edge portion of a new super-precision R cutting diamond tool used in forming the cut surface of the optical surface (molding surface) of the molding die shown in FIG. 3.

1. Using a material of high ease of being cut for a die material, which has a sufficient mechanical strength and hardness (Hv520) as a die material, and by carrying out mold processing using a super-precision diamond tool and a super-precision lathe to be described below, a cut-processed surface which is extremely smooth as shown in FIG. 3 even after 3 km length cutting could be actualized, and as shown in FIG. 4, nearly no chip is produced in the tool edge, which is extremely gently and evenly worn; accordingly, the roundness of the initial rake face of the tool is maintained for a long time during working, and a high-precision die processing could be actualized.

Figure 5:
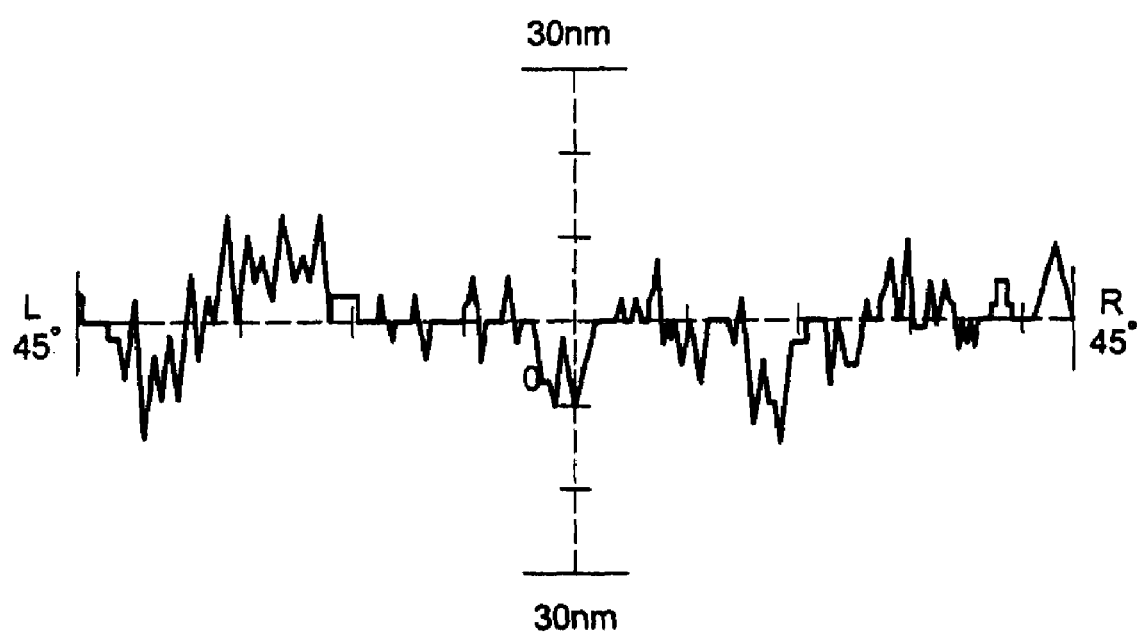
FIG. 5 is a drawing showing the result of measuring the roundness of the rake face of the edge of the super-precision R cutting diamond tool shown in FIG. 4.

2. With respect to a super-precision diamond tool, using a tool roundness measuring instrument for a tool having a resolving power of 5 nm, the inventors grasp the initial roundness of the rake face and make an effort to improve it; then, as the result of it, as shown in FIG. 5, it has become possible to select a super-precision R diamond tool having a tool rake face roundness of 30 nm or less.

Figure 6:
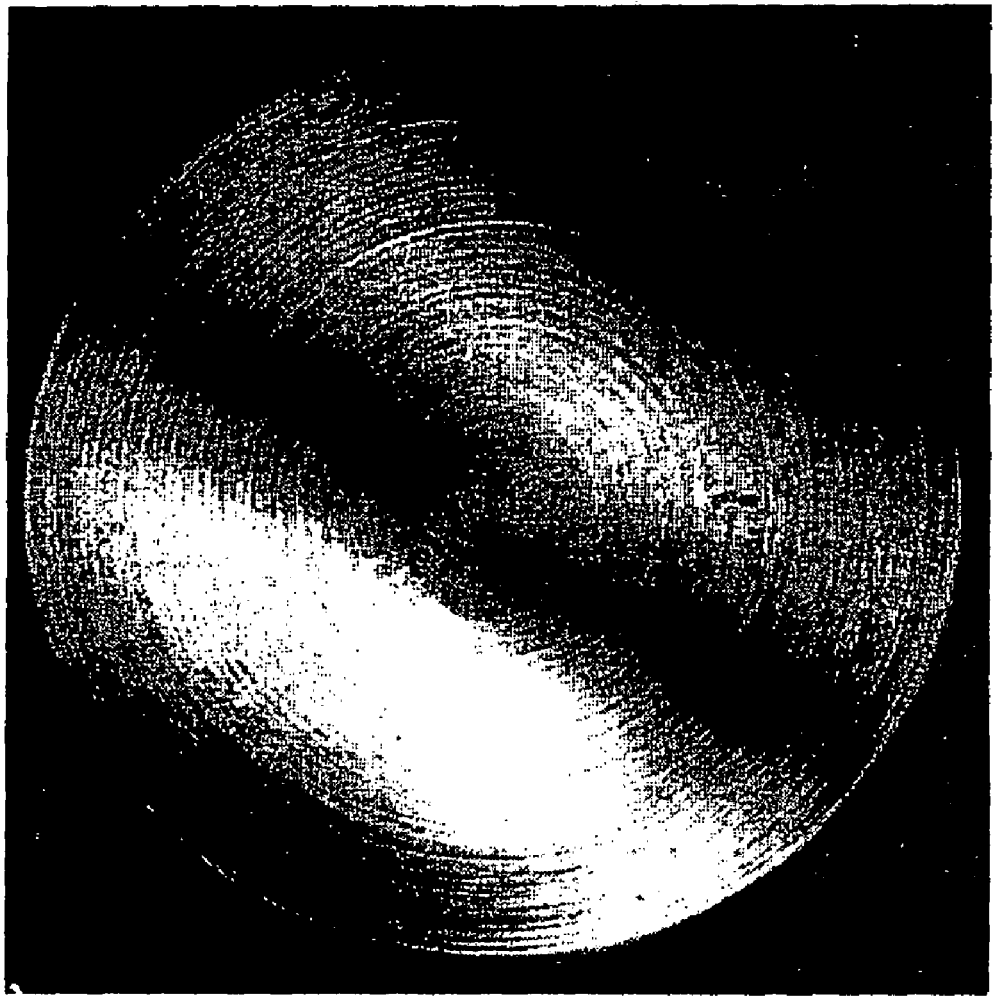
FIG. 6 is a drawing showing an interferogram of the spherical cut surface of a molding die after an initial working by a cutting process in an embodiment of this invention.
Figure 7:
FIG. 7 is a drawing showing an interferogram of the spherical cut surface of the molding die after 6 hours' cutting work shown in FIG. 6.

3. With respect to a super-precision lathe, a super-precision lathe having an axial resolving power of 1 nm, the stiffness of the slide table of 1000 N/μm has been newly developed, and in plane working of an S3M material, a surface roughness of Rtm=4.9 nm, and Ra=0.800 nm was obtained. Further, a fundamental design was carried out in order that the drift of the tool position owing to the change of the environment may come to minimum, and as shown by the interferogram of a spherical cut surface after working in FIG. 6 and FIG. 7, it could be actualized a high working reproducibility such that the deviation of the worked shape is 50 nm or less in a temperature variation of 0.5° C., even after the working of a spherical concave surface with an R of 3 mm (having a normal angle of 48°) was continued for 6 hours.

EXAMPLES OF PRACTICE

In the following, the examples of practice 1 and 2, in which an optical element of this invention was manufactured, will be explained.

Example 1

As the example of practice 1, by using freely the above-described technology, a molding die for a collimator lens for an optical disk adaptable to 400 nm light was manufactured, to find that the surface roughness of the optical surface (molding surface) of the molding die was Rtm=5.8 nm, and Ra=1.4 nm. The surface roughness of a collimator lens, which was injection-molded from a thermoplastic resin using this molding die, was found to have approximately the same value as the optical surface (molding surface) of the molding die, and the transmittance in the case where a surface reflection reducing coating was applied on the both optical surfaces was 94% for a light having a wavelength of 400 nm. It is practically of no problem at all, and scattering by the both optical surfaces was scarcely observed. In addition, the surface roughness was measured in the lateral direction (the perpendicular direction to the cutting direction) of the drawing in FIG. 3.

Example 2

In the following, as the example of practice 2, an objective lens for a short-wavelength light source was made of a glass material by glass molding. First, an optical surface (molding surface) was formed in a molding die made up of a super-hard material as a matrix material and was subjected to a conventional polishing process; then, by polishing it with fine diamond whet particles having a diameter of 1 to 2 μm for several minutes, the surface roughness could be made to be such one as expressed by Rtm=10 nm, and Ra=3 nm. Further, for a protective coating, a coating based on Pt/Ir sputtering was applied to it, to form an optical surface layer of the molding die with a thickness of 0.5 μm. The transmittance of an objective lens molded by this molding die was measured, after a surface reflection reducing coating was applied, for a light having a wavelength of 400 nm, to find that it was 95% or over and scattering by the optical surface of the objective lens was scarcely observed; thus, it was possible to form a clear focus.

A molding die for use in glass molding as described in the above is usually made of an extremely hard heat-resistant material such as a ceramic material or a WC alloys material, and in many cases a protective coating is applied on its optical surface (molding surface). This protective coating of a molding die is one for preventing that the matrix material is oxidized and deteriorated by it that the optical surface (molding surface) of the molding die is heated to about 600° C., and that the die becomes incapable of being used by the molded glass adhering to the optical surface at the time of die pressing. However, because the thickness of the protective layer is usually such thin as 1 μm or so, the shape of the optical surface and the surface roughness to be mold-transferred are subject to the result of working the ceramic material or the WC alloys material. For this reason, as a molding die has its optical surface (molding surface) formed by a grinding process, the surface roughness is large by only a grinding process; therefore, a polishing process is applied as an after processing. The finished surface roughness in this case is generally such one as expressed by Rtm≅30 nm, and Ra≅10 nm, because the wavelength of the light source was in the longer wavelength side than 500 nm in conventional uses. For this reason, for an optical element for a short wavelength which is out of conventional specifications, it has been impossible to obtain a sufficient surface roughness; however, in this example of practice, an objective lens having an optical surface with an Ra of 5 nm or less as described in the above could be obtained by glass molding.

In the following, the method of measuring the center-line mean roughness Ra will be explained. For a method of measuring a surface roughness, there are two methods, namely the non-contact method and the tracer method; as for the non-contact method, in addition to a method using a visible light, there is a method using a SEM (scanning electron microscope) by electron rays, and as for the tracer method, in addition to a method of mechanically tracing the surface of the object of measurement, there is a method based on a probe scanning type microscope such as an AFM. Besides, it is appropriate to measure the Ra also by using an interferometer.

Further, the center-line mean roughness Ra is defined by the above-described expression (1), it has a merit that, when the same object of measurement is measured by different methods such as the above-described contact method and the non-contact method, the measured values do not depend on the methods and agree with each other comparatively well, and that it is hard to be influenced by error factors such as dusts and local scratches which are not relevant to the proper surface roughness. Accordingly, the value of Ra is the most suitable value for the surface roughness, in order to obtain a relation with scattering which is an overall physical phenomena of the optical surface.

As described in the foregoing, this invention has been explained by the embodiments and the examples of practice, but this invention should not be limited to these, and various kinds of variations are possible within the scope of the technological idea of this invention. For example, there is no particular limitation in the kinds of the optical element, and it is a matter of course that an optical element other than a lens such as a mirror may be appropriate; further, and its method of manufacturing is not limited to molding methods. Moreover, it is a matter of course that the optical surface of the optical element is not necessarily an aspherical surface, but may be of another shape such as a sphere or a plane.

Further, the optical system including the optical element of this invention may be an optical system other than an optical system for an optical pickup, and in particular, it is suitable for an optical system in which a light having a wavelength of 500 nm or less is used. Further, the optical pickup device including such an optical system may be a device for writing information on an optical disk.

According to this invention, it is possible to provide an optical element and an optical system which are capable of reducing scattered light especially with respect to a light having a wavelength of 500 nm or less.

Further, it is possible to provide an optical pickup device which is capable of preventing an error in reading and writing by reducing scattered light especially even in the case where a light source having a wavelength of 500 nm or less is used.

Besides, it is possible to provide an optical element, an optical system, an optical pickup device, and a recording and reproducing apparatus for an optical information recording medium which have a small loss of light quantity and a high efficiency of light utilization.

Furthermore, it is possible to provide a molding die capable of obtaining especially the above-described optical element.

Disclosed embodiments can be varied by a skilled person without departing from the spirit and scope of the invention.

What is claimed is:

1. A molding die for an optical element; comprising:
   a molding surface,
   wherein the molding surface comprises at least one aspherical surface having a center-line mean roughness Ra not more than 5 nm.

* * * * *